(12) United States Patent
Mabuchi

(10) Patent No.: US 7,119,840 B2
(45) Date of Patent: Oct. 10, 2006

(54) SOLID-STATE IMAGE PICKUP DEVICE HAVING LOWER POWER CONSUMPTION

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 720 days.

(21) Appl. No.: 10/244,780

(22) Filed: Sep. 16, 2002

(65) Prior Publication Data

US 2003/0063206 A1 Apr. 3, 2003

(30) Foreign Application Priority Data

Sep. 17, 2001 (JP) ............................. 2001-281605

(51) Int. Cl.
*H04N 3/15* (2006.01)
*H01L 27/14* (2006.01)
(52) U.S. Cl. .................... 348/308; 348/301; 250/208.1
(58) Field of Classification Search ................ 348/294, 348/300, 301, 308; 250/208.1
See application file for complete search history.

(56) References Cited

U.S. PATENT DOCUMENTS 6,850,278 B1* 2/2005 Sakurai et al. .............. 348/302

* cited by examiner

*Primary Examiner*—Ngoc-Yen Vu
*Assistant Examiner*—Adam L. Henderson
(74) *Attorney, Agent, or Firm*—Robert J. Depke; Rockey, Depke, Lyons & Kitzinger LLC

(57) ABSTRACT

The invention is intended to raise the potential at an amplification transistor without increasing a source voltage, and to operate each pixel unit at a lower voltage. A reset transistor and a transfer transistor are serially connected between a driving power source (driving voltage Vdd) and an output of a PD. A floating diffusion (FD) node is provided between a source of the reset transistor and a drain of the transfer transistor. A selection transistor and an amplification transistor are serially connected between a vertical signal line and the driving power source. A gate of the amplification transistor is connected to the FD node. The amplification transistor and the selection transistor are connected at positions reversal to those in a conventional device; namely the amplification transistor is disposed on the side nearer to the vertical signal line. Then, the selection transistor is turned on after the end of reset operation by the reset transistor.

4 Claims, 4 Drawing Sheets

SOLID-STATE IMAGE PICKUP DEVICE HAVING LOWER POWER CONSUMPTION

This application claims priority to Japanese Patent Application Number JP2001-281605 filed Sep. 17, 2001 and each of which are incorporated herein by reference.

BACKGROUND OF THE INVENTION

1. Field of the Invention

The present invention relates to a solid-state image pickup device of a structure having a plurality of image pickup pixels, each provided with a photoelectric transducer, and reading a signal photoelectrically converted and accumulated in the photoelectric transducer out of each image pickup pixel unit using a plurality of transistors. More particularly, the present invention relates to a solid-state image pickup device capable of operating at a lower voltage.

2. Description of the Related Art

Hitherto, a solid-state image pickup device has been proposed in the form of a MOS solid-state image pickup device including photodiodes, which serve as photoelectric transducers and are arranged in a one-to-one relation to image pickup pixels, and various MOS transistors for transferring, selecting, amplifying and resetting photo-charges accumulated in each photodiode.

FIG. 4 is a circuit diagram showing one example of a construction of a conventional pixel unit in such a MOS solid-state image pickup device, and FIG. 5 is a timing chart showing one example of operation of the pixel unit shown in FIG. 4.

The construction shown in FIG. 4 represents a circuit used for outputting photoelectrons accumulated in a photodiode 10 to a vertical signal line 12. The lower end side (i.e., the voltage output to an S/H and CDS circuit described later) of the vertical signal line 12 is held at a high impedance level. The upper end side of the vertical signal line 12 is connected to a constant-current source 14 located outside the pixel unit (image pickup section).

Further, as shown in FIG. 4, four MOS transistors 20, 22, 24 and 26 are disposed around the photodiode (referred to as "PD" hereinafter) 10.

A reset transistor 20 and a transfer transistor 22 are connected between a driving power source (driving voltage Vdd) and an output of the PD 10. A floating diffusion (referred to as "FD" hereinafter) node 16 is provided between a source of the reset transistor 20 and a drain of the transfer transistor 22.

Further, a selection transistor 24 and an amplification transistor 26 are connected between the vertical signal line 12 and the driving power source (driving voltage Vdd). The FD node 16 is connected to a gate of the amplification transistor 26.

A reset pulse is inputted to a gate of the reset transistor 20, a transfer pulse is inputted to a gate of the transfer transistor 22, and a selection pulse is inputted to a gate of the selection transistor 24.

In the circuit construction described above, when the selection transistor 24 is turned on, the amplification transistor 26 and the constant-current source 14 located outside the image pickup section cooperate to establish a source follower connection. Therefore, the potential of the vertical signal line 12 takes a value following the gate voltage of the amplification transistor 26, i.e., the potential at the FD node 16. That value provides an output of the pixel.

A method of driving the conventional pixel unit will be described below with reference to FIG. 5.

First, at the timing of "t10" along the horizontal axis of FIG. 5, photoelectrons are accumulated in the PD 10.

Then, at the timing of "t11", the selection transistor 24 is turned on.

At the timing of "t12", a reset pulse is inputted to the reset transistor 20, thereby resetting the FD node 16.

Thereafter, during a period including the timing "t13", the potential (reset level) of the vertical signal line 12 is taken in by the S/H and CDS circuit of a subsequent stage.

Then, at the timing of "t14", a transfer pulse is inputted to the transfer transistor 22 for transferring the photoelectrons from the PD 10 to the FD node 16.

Thereafter, during a period including the timing of "t15", the potential (light level) of the vertical signal line 12 is taken in again by the S/H and CDS circuit of the subsequent stage.

At the timing of "t16", a reset pulse is inputted to reset the FD node 16 again.

Finally, at the timing of "t17", the selection transistor 24 is turned off for restoration to the state at The S/H and CDS circuit serves as a circuit for obtaining the difference between two voltages successively taken in by itself, and holding that difference. In the operation described above, the S/H and CDS circuit obtains the difference between a value of the reset level and a value of the light level, and holds that difference as a signal level.

In the conventional solid-state image pickup device described above, it has been general that the selection transistor 24 is arranged on the side closer to the vertical signal line 12 than the amplification transistor 26, as shown in FIG. 4. The reason is in avoiding a voltage fall caused by lowering due to the threshold of the selection transistor 24 and an increase in resistance of the selection transistor 24.

On the other hand, it has also been general that the reset pulse is inputted during a period in which the selection transistor 24 is turned on, as shown in FIG. 5. The reason is presumably in such a common sense based on intuition that the transfer pulse and the reset pulse are preferably held in the same state (i.e., both the pulses are preferably inputted during a period in which the selection transistor 24 is turned on).

Meanwhile, one of the greatest advantages of a MOS type solid-state image pickup device is that the device operates at a voltage as low as that required for a surrounding LSI circuit.

Also, with the progress of the LSI technology, there is a tendency in recent years that the source voltage of LSI circuits lowers rapidly from 5 V to 3.3 V, then to 2.5 V, then to 1.8 V, and then to 1.3 V.

The MOS type solid-state image pickup device requires a voltage covering a source-follower operating voltage, a signal amplitude and a margin, and the signal amplitude is required to be 500 mV–1 V.

For those reasons, in the conventional MOS type solid-state image pickup device, a peripheral circuit such as a TG can be realized in match with the tendency toward a lower voltage, but the image pickup device itself has a difficulty in adaptation to a source voltage of not higher than 2.5 V because the voltage necessary for operating the pixel unit imposes an obstacle.

SUMMARY OF THE INVENTION

In view of the state of the art set forth above, it is an object of the present invention to provide a solid-state image pickup device, which can raise a potential at an amplification transistor without increasing a source voltage, and can operate a pixel unit at a lower voltage.

To achieve the above object, the present invention provides a solid-state image pickup device including a plurality of pixel units arrayed in an image pickup section and each provided with a photoelectrically converting unit for accumulating photo-charges depending on an amount of light received, a floating diffusion node for receiving the photo-charges accumulated by said photoelectrically converting unit, a transfer unit for transferring the photo-charges accumulated by the photoelectrically converting unit to the floating diffusion node, an amplification transistor for taking out a signal corresponding to the photo-charges from the floating diffusion node, a reset transistor for resetting the photo-charges applied to the floating diffusion node, and a selection transistor connected to the amplification transistor and selectively connecting an output of the amplification transistor to a signal line connected to a current source located outside the image pickup section, the amplification transistor being disposed between the selection transistor and the signal line, and the selection transistor being turned on after the end of reset operation by the reset transistor.

With the solid-state image pickup device according to the present invention, by combining two features with each other, i.e., that the amplification transistor is disposed between the selection transistor and the signal line, and that the selection transistor is turned on after the end of reset operation by the reset transistor, the potential at the amplification transistor can be raised without increasing the source voltage. Accordingly, a voltage required for the operation of the pixel unit can be reduced and the solid-state image pickup device can be operated at a lower voltage.

DESCRIPTION OF THE PREFERRED EMBODIMENTS

A preferred embodiment of the present invention will be described below with reference to the drawings.

Figure 1:
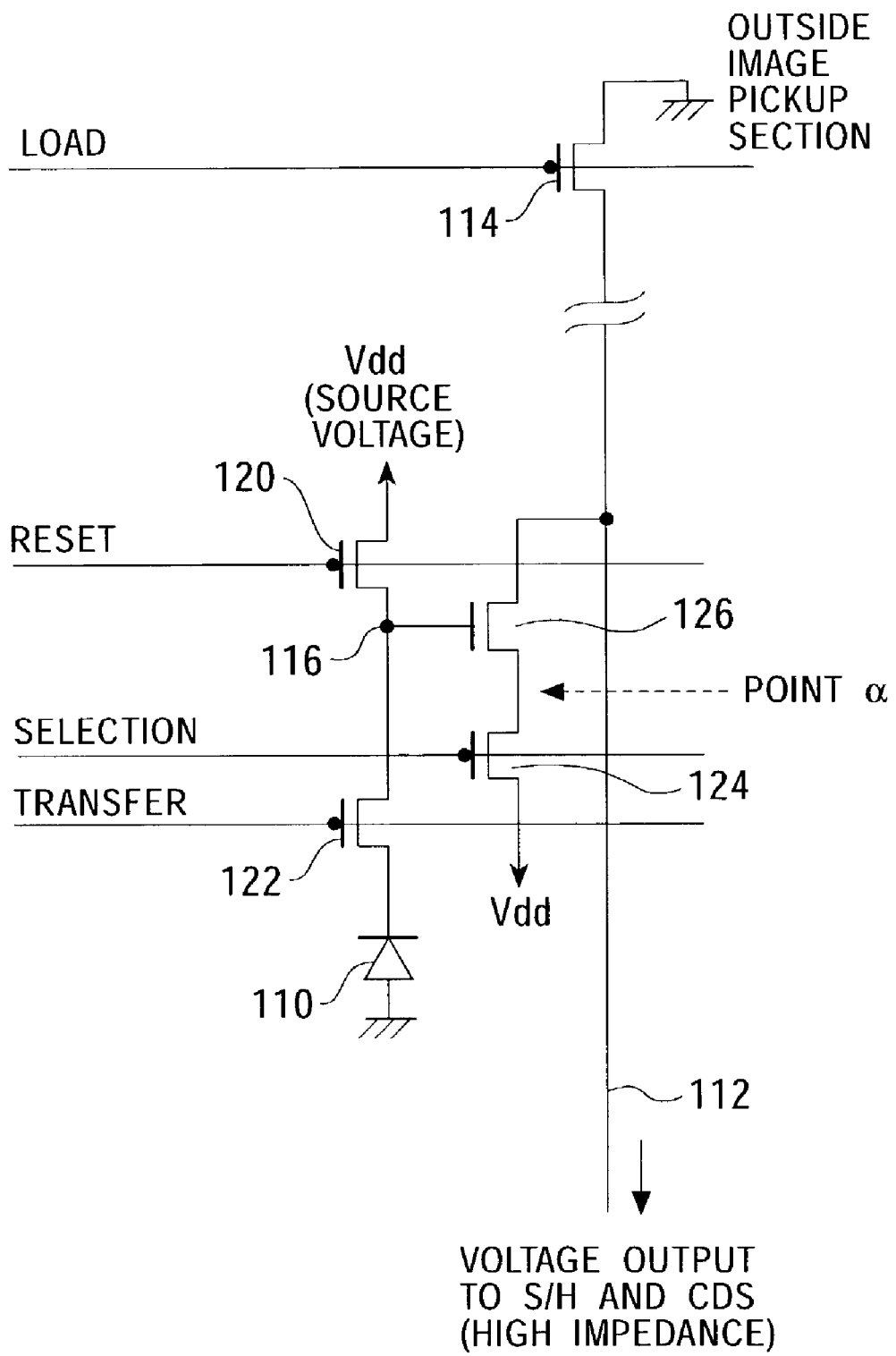
FIG. 1 is a circuit diagram showing one example of a construction of a pixel unit in a solid-state image pickup device according to the present invention.
Figure 2:
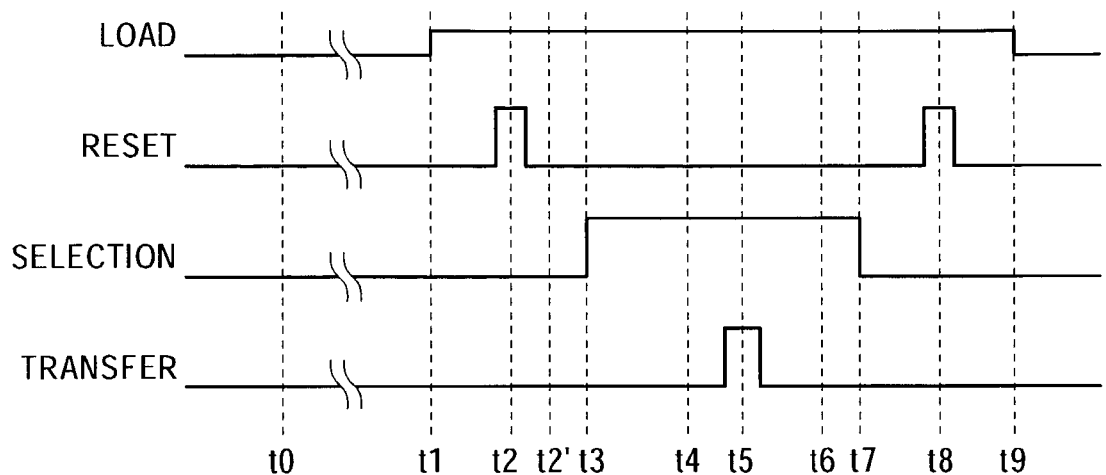
FIG. 2 is a timing chart showing one example of operation of the pixel unit shown in FIG. 1.

FIG. 1 is a circuit diagram showing one example of a construction of a pixel unit in a solid-state image pickup device according to the present invention, and FIG. 2 is a timing chart showing one example of operation of the pixel unit shown in FIG. 1.

Figure 3:
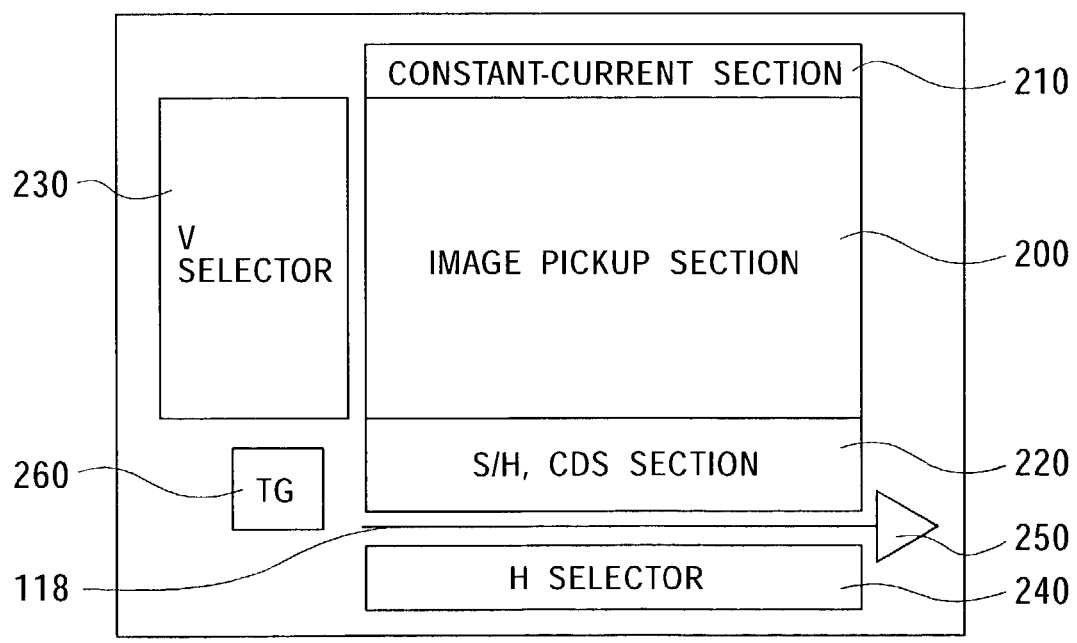
FIG. 3 is a plan view showing an overall construction of the solid-state image pickup device employing an array of the pixel units shown in FIG. 1.

Also, FIG. 3 is a plan view showing an overall construction of a MOS type solid-state image pickup device employing an array of the pixel units shown in FIG. 1.

Figure 4:
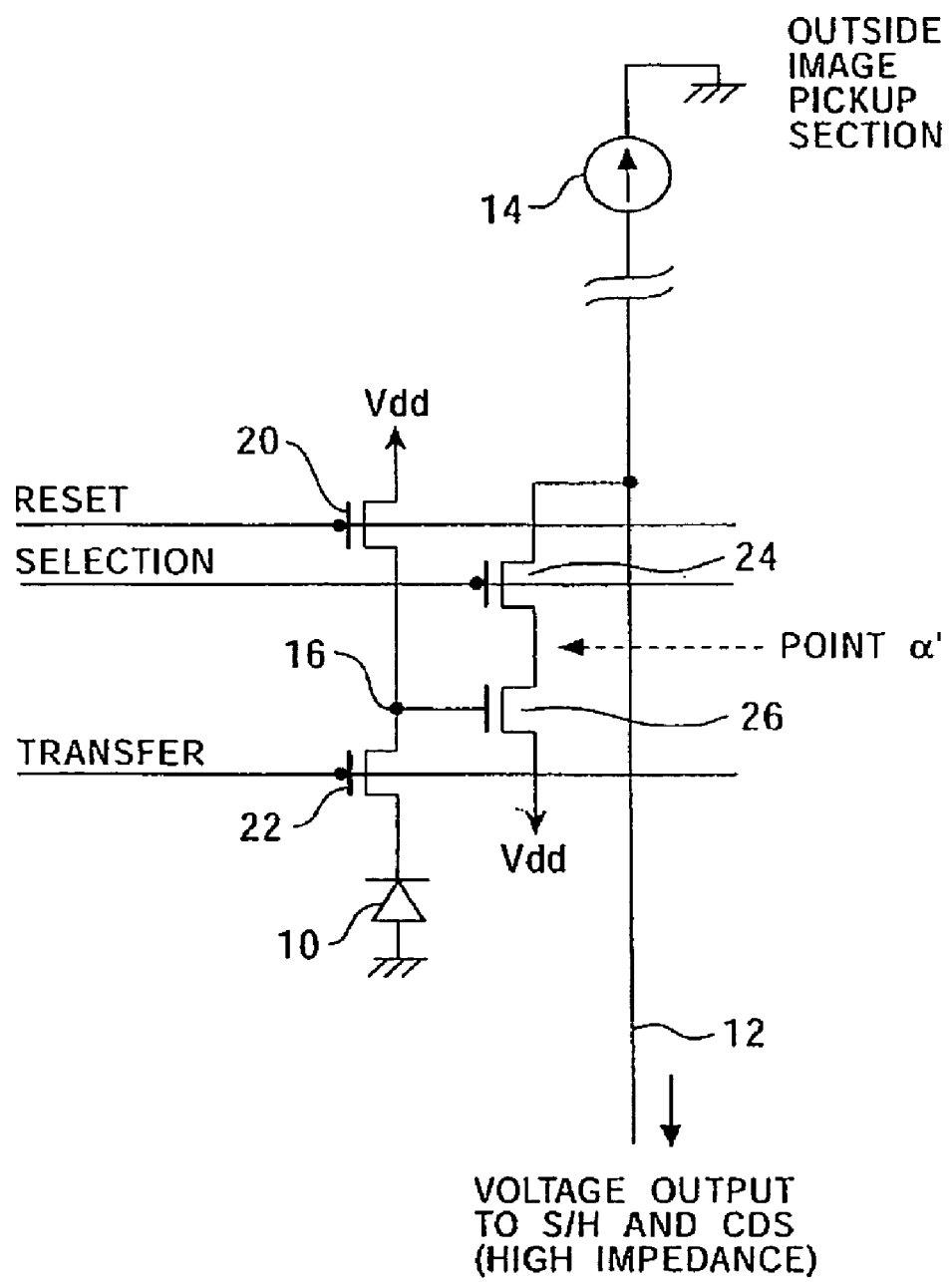
FIG. 4 is a circuit diagram showing one example of a construction of a conventional pixel unit in a conventional solid-state image pickup device.
Figure 5:
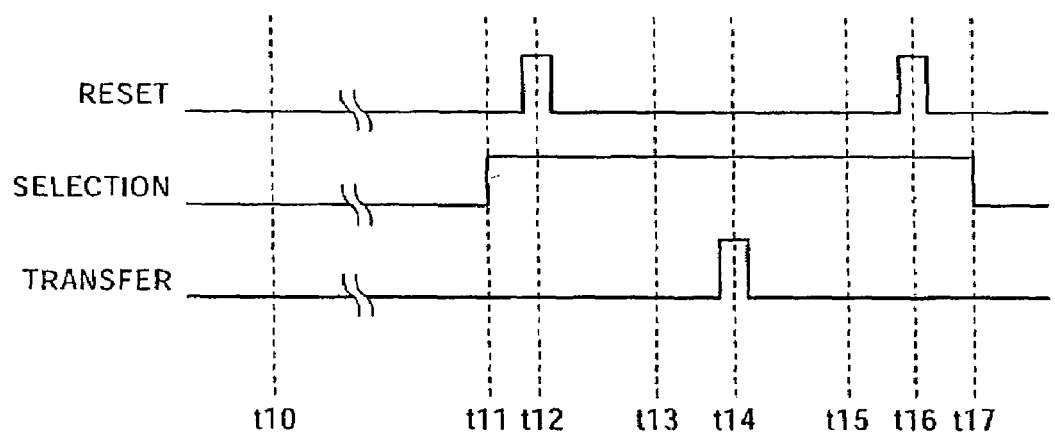
FIG. 5 is a timing chart showing one example of operation of the pixel unit shown in FIG. 4.

The solid-state image pickup device of this embodiment differs from the conventional device, shown in FIGS. 4 and 5, in that an amplification transistor 126 and a selection transistor 124 are connected at positions reversal to those in the conventional device, and that a reset pulse is located outside a selection pulse.

A description is now made of the construction and operation of the solid-state image pickup device of this embodiment.

As shown in FIG. 1, each of pixel units used in the solid-state image pickup device of this embodiment comprises a photodiode (PD) 110, a vertical signal line 112, and MOS transistors 120, 122, 124 and 126.

Also, in FIG. 1, the lower end side (i.e., the voltage output to an S/H and CDS circuit described later) of the vertical signal line 112 is held at a high impedance level. The upper end side of the vertical signal line 12 is connected to a load transistor 114 serving as a constant-current source located outside the pixel unit.

A reset transistor 120 and a transfer transistor 122 are connected between a driving power source (driving voltage Vdd) and an output of the PD 110. A floating diffusion (FD) node 116 is provided between a source of the reset transistor 120 and a drain of the transfer transistor 122.

Further, a selection transistor 124 and an amplification transistor 126 are connected between the vertical signal line 112 and the driving power source (driving voltage Vdd). The FD node 116 is connected to a gate of the amplification transistor 126.

A reset pulse is inputted to a gate of the reset transistor 120, a transfer pulse is inputted to a gate of the transfer transistor 122, and a selection pulse is inputted to a gate of the selection transistor 124.

In this embodiment, the amplification transistor 126 and the selection transistor 124 are connected at positions reversal to those in the conventional device. Stated otherwise, the selection transistor 124 is disposed on the side nearer to the driving power source, and the amplification transistor 126 is disposed on the side nearer to the vertical signal line 112.

An overall construction of the MOS type solid-state image pickup device of this embodiment will now be described briefly with reference to FIG. 3.

An image pickup section 200 is constructed by arranging a multiplicity of pixel units, each having the above-described construction shown in FIG. 1, in the form of a two-dimensional matrix arrayed in the vertical direction and the horizontal direction.

A constant-current section 210 is constructed by providing a multiplicity of constant-current circuits in a one-to-one relation to pixel rows, and an S/H and CDS section 220 is constructed by providing a multiplicity of S/H and CDS circuits in a one-to-one relation to the pixel rows.

A vertical (V) selector 230 selects the pixel units on the row-by-row basis, and a horizontal (H) selector 240 reads out respective signals held by the S/H and CDS circuits in the S/H and CDS section 220 to a horizontal signal line 118 in sequence. The read-out signals are processed by an output section 250 (including an output amplifier, an AGC, an A/D, etc.) and then outputted as image pickup signals.

Also, TG 260 represents a timing generator for creating pulses required for the operations of the above-described sections and outputting the created pulses.

The operation of the pixel unit in this embodiment will now be described with reference to FIG. 2.

In the circuit construction shown in FIG. 1, when the selection transistor 124 is turned on, the amplification transistor 126 and the constant-current source (load transistor) 114 located outside the image pickup section cooperate to establish a source follower connection. As with the conventional device, therefore, the potential of the vertical signal line 112 takes a value following the gate voltage of the amplification transistor 126, i.e., the potential at the FD node 116.

Furthermore, the pixel unit operates in accordance with the following method as shown in FIG. 2.

First, at the timing of "t0" along the horizontal axis of FIG. 2, photoelectrons are accumulated in the PD 110.

Then, at the timing of "t1", the load transistor 114 is turned on. Because the load transistor 114 serves as a constant-current source herein, the gate voltage is held at about 0.8 V.

At the timing of "t2", a reset pulse is inputted to the reset transistor 120, thereby resetting the FD node 116.

At the timing of "t3", the selection transistor 124 is turned on.

Thereafter, during a period including the timing "t4", the potential (reset level) of the vertical signal line 112 is taken in by the S/H and CDS circuit of a subsequent stage.

Then, at the timing of "t5", a transfer pulse is inputted to the transfer transistor 122 for transferring the photoelectrons from the PD 110 to the FD node 116.

Thereafter, during a period including the timing of "t6", the potential (light level) of the vertical signal line 112 is taken in again by the S/H and CDS circuit of the subsequent stage.

Then, at the timing of "t7", the selection transistor 124 is turned off.

At the timing of "t8", a reset pulse is inputted to reset the FD node 116 again.

Finally, at the timing of "t9", the load transistor 114 is turned off.

The other operation of the pixel unit is assumed to be the same as the above-described one in the conventional device.

Advantages obtainable with the foregoing operation of this embodiment will be described below.

First, upon the load transistor 114 being tuned on at "t1", the potential of the vertical signal line 112 becomes 0 V.

Then, upon the FD node 116 being reset at "t2", a potential Vfd at the FD node 116 at the timing of "t2'" after the resetting is given by the following equation (1);

$$Vfd = Vdd - A - B - C \quad \text{(Eq. 1)}$$

where Vdd is the source voltage, A is a voltage fall caused by lowering due to the threshold of the reset transistor 120, B is a voltage fall caused by capacitive coupling between the reset gate and the FD node 116, and C is a voltage fall caused by return of channel electrons in the reset transistor 120.

In other words, the voltage at the FD node 116 is reduced from the source voltage Vdd because of factors of the above three voltage falls A, B and C.

That reduced voltage is equal to the FD potential obtained as the reset level taken in at "t13" in the above-described conventional device.

More specifically, such a voltage fall at the FD node in the conventional device has impeded the operation at a lower voltage. Assuming, for example, that A is 0.5 V and the sum of B and C is 0.4 V, a voltage loss of 0.9 V occurs at the FD node.

To overcome that problem, in this embodiment, the FD potential obtained as the reset level taken in at "t4" can be raised by modifying the conventional device in two points; i.e., the amplification transistor 126 and the selection transistor 124 are connected at positions reversal to those in the conventional device, and a reset pulse at "t2" is inputted during a period in which the selection transistor 124 is held turned off.

The reason is as follows. At the timing of "t2'", the potential at a point (node) a between the amplification transistor 126 and the selection transistor 124 is 0 V.

Then, upon the selection transistor 124 being turned on at "t3", a potential Vα at a point α is given by the following equation (2);

$$V\alpha = Vdd - D - E \quad \text{(Eq. 2)}$$

where D is a voltage fall caused by lowering due to the threshold of the selection transistor 124, and E is a voltage fall caused by the resistance of the selection transistor 124.

In other words, the potential at the point α is raised from 0 V to a value given by the equation (2).

Further, because the point α and the FD node 116 are capacitively coupled to each other through the gate of the amplification transistor 126, the potential at the FD node 116 is also raised from the value given by the equation (1) at the same time. An amplitude of the resulting voltage rise is as great as 0.3 V to 0.7 V with respect to, for example, Vdd=2.5 V. That amplitude is a very serious factor in the viewpoint of realizing the operation at a lower voltage.

If the selection transistor is positioned on the side nearer to the signal line as with the conventional device shown in FIG. 4, the potential at a point α' at the timing of inputting a reset pulse would take a value nearer to Vdd than 0 V even in the case of operating the device as shown in FIG. 2. Therefore, even if the selection transistor is turned on, the potential at the point α' would not rise from that value, and hence the potential at the FD node could not be increased.

Also, if a first reset pulse is inputted during a period, in which the selection transistor 24 is held turned on, as with the operation of the conventional device shown in FIG. 5, the FD potential taken in as the reset level would be given by the equation (1) and hence the potential at the FD node could not also be increased even in the case of employing the circuit construction shown in FIG. 1.

Stated otherwise, the novel effect of the present invention, i.e., the operation at a lower voltage with an increase of the FD potential, can be realized by combining the circuit construction shown in FIG. 1 and the operating method shown in FIG. 2 with each other as described above in the embodiment.

Furthermore, in order to enhance the effect of raising the potential at the FD node, it is desired that a value of Vα in the above equation (2) be as large as possible (as close as to Vdd).

For that purpose, it is desired to eliminate a voltage fall component caused by lowering due to the threshold of the selection transistor 124 by employing one of methods given below.

(1) The selection transistor 124 is constituted as a depletion transistor having a threshold set to such a low level that the selection transistor 124 causes no voltage lowering due to the threshold thereof when turned on. In this method, the threshold of the selection transistor 124 is not more than −0.4 V, for example, in the case of Vdd=2.5 V.

(2) A high level applied to the gate of the selection transistor 124 is set to be higher than the source voltage to such a level that the selection transistor 124 causes no voltage lowering due to the threshold thereof. The high level is not lower than 3.1 V, for example, in the case of Vdd=2.5 V.

It is also possible to eliminate a voltage fall component caused by lowering due to the threshold of the reset transistor 120, which appears in the equation (1). To this end, one of methods described below is preferably used in addition to the above-described one.

(1) The reset transistor 120 is constituted as a depletion transistor having a threshold set to such a low level that the voltage at the FD node 116 can be reset to the source voltage when turned on. In this method, the threshold of the reset transistor 120 is not more than −0.4 V, for example, in the case of Vdd=2.5 V.

(2) A high level applied to the gate of the reset transistor 120 is set to be higher than the source voltage to such a level that the voltage at the FD node 116 can be reset to the source voltage. The high level is not lower than 3.1 V, for example, in the case of Vdd=2.5 V.

Note that while photoelectrically converting means and transfer means are constituted in the embodiment using a photodiode and a transfer gate made up of MOS transistors, similar effects to those described above can also be obtained by employing instead a photo-gate made up of MOS transistors.

Also, while the MOS transistors and the load transistor disposed in each pixel unit are all constituted as NMOS type, the same effects can be obtained with a similar circuit construction just by reversing high and low levels of each voltage, even when all those transistors are replaced by PMOS ones.

According to the solid-state image pickup device of the present invention, as described above, the amplification transistor is disposed between the selection transistor and the signal line, and the selection transistor is turned on after the end of reset operation by the reset transistor. By combining those two features with each other, the potential at the amplification transistor can be raised without increasing the source voltage, and a voltage required for the operation of the pixel unit can be reduced correspondingly. As a result, it is possible to operate the solid-state image pickup device at a lower voltage.

What is claimed is:

1. A solid-state image pickup device having pixels each provided with photoelectrically converting means for accumulating photo-charges depending on an amount of light received, a floating diffusion node for receiving the photo-charges accumulated by said photoelectrically converting means, transfer means for transferring the photo-charges accumulated by said photoelectrically converting means to said floating diffusion node, an amplification transistor for taking out a signal corresponding to the photo-charges from said floating diffusion node, a reset transistor for resetting said floating diffusion node, and a selection transistor connected to said amplification transistor and selectively providing an output from said amplification transistor to a signal line, said amplification transistor being disposed between said selection transistor and said signal line, and said selection transistor being turned on after the end of reset operation by said reset transistor, wherein said selection transistor is constituted as a depletion transistor having a threshold set to such a low level that there occurs substantially no voltage lowering due to a threshold of said selection transistor when turned on.

2. A solid-state image pickup device having pixels each provided with photoelectrically converting means for accumulating photo-charges depending on an amount of light received, a floating diffusion node for receiving the photo-charges accumulated by said photoelectrically converting means, transfer means for transferring the photo-charges accumulated by said photoelectrically converting means to said floating diffusion node, an amplification transistor for taking out a signal corresponding to the photo-charges from said floating diffusion node, a reset transistor for resetting said floating diffusion node, and a selection transistor connected to said amplification transistor and selectively providing an output from said amplification transistor to a signal line, said amplification transistor being disposed between said selection transistor and said signal line and said selection transistor being turned on after the end of reset operation by said reset transistor, wherein a high level of a selection pulse applied to a gate of said selection transistor is set to be higher than a source voltage to such a level that said selection transistor causes substantially no voltage lowering due to a threshold thereof.

3. A solid-state image pickup device having pixels each provided with photoelectrically converting means for accumulating photo-charges depending on an amount of light received, a floating diffusion node for receiving the photo-charges accumulated by said photoelectrically converting means, transfer means for transferring the photo-charges accumulated by said photoelectrically converting means to said floating diffusion node, an amplification transistor for taking out a signal corresponding to the photo-charges from said floating diffusion node, a reset transistor for resetting said floating diffusion node, and a selection transistor connected to said amplification transistor and selectively providing an output from said amplification transistor to a signal line, said amplification transistor being disposed between said selection transistor and said signal line, and said selection transistor being turned on after the end of reset operation by said reset transistor.

wherein said reset transistor is constituted as a depletion transistor having a threshold set to such a low level that a voltage at said floating diffusion node is reset to substantially the source voltage when turned on.

4. A solid-state image pickup device having pixels each provided with photoelectrically converting means for accumulating photo-charges depending on an amount of light received, a floating diffusion node for receiving the photo-charges accumulated by said photoelectrically converting means, transfer means for transferring the photo-charges accumulated by said photoelectrically converting means to said floating diffusion node, an amplification transistor for taking out a signal corresponding to the photo-charges from said floating diffusion node, a reset transistor for resetting said floating diffusion node, and a selection transistor connected to said amplification transistor and selectively providing an output from said amplification transistor to a signal line, said amplification transistor being disposed between said selection transistor and said signal line, and said selection transistor being turned on after the end of reset operation by said reset transistor, wherein a high level of a reset pulse applied to a gate of said reset transistor is set to be higher than the source voltage to such a level that a voltage at the floating diffusion node is reset to substantially the source voltage when turned on.

* * * * *